(12) United States Patent
Hanks et al.

(10) Patent No.: US 8,609,912 B2
(45) Date of Patent: Dec. 17, 2013

(54) PROCESSING OF FEEDSTOCKS IN SEPARATED REACTOR VOLUMES

(75) Inventors: Patrick L. Hanks, Fairfax, VA (US); Michel Daage, Hellertown, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/365,328

(22) Filed: Feb. 3, 2012

(65) Prior Publication Data

US 2012/0209041 A1    Aug. 16, 2012

Related U.S. Application Data

(60) Provisional application No. 61/443,513, filed on Feb. 16, 2011.

(51) Int. Cl.
*C07C 5/02*    (2006.01)

(52) U.S. Cl.
USPC .................. 585/301; 585/302; 585/303

(58) Field of Classification Search
None
See application file for complete search history.

(56) References Cited

U.S. PATENT DOCUMENTS

| | | | |
|---|---|---|---|
| 3,211,641 A | 10/1965 | Halik et al. | |
| 3,440,020 A | 4/1969 | Owen | |
| 4,417,974 A | 11/1983 | Haunschild | |
| 5,985,131 A | 11/1999 | Gupta et al. | |
| 6,287,522 B1 | 9/2001 | Lomas | |
| 7,597,796 B2 | 10/2009 | Andreux et al. | |
| 2008/0173570 A1 | 7/2008 | Marchand et al. | |
| 2008/0214883 A1* | 9/2008 | Olbert et al. | 585/654 |
| 2009/0166256 A1 | 7/2009 | Lewis et al. | |
| 2010/0307052 A1 | 12/2010 | Stevens et al. | |
| 2011/0245543 A1* | 10/2011 | Cortright et al. | 568/303 |

* cited by examiner

*Primary Examiner* — Tam M Nguyen
(74) *Attorney, Agent, or Firm* — Bruce M. Bordelon; Glenn T. Barrett

(57) ABSTRACT

Separated volumes can be created in a reactor using interior dividing wall or interior conduit structures. Feedstocks can be hydroprocessed in the separated volumes to allow multiple types of hydroprocessing conditions and/or feeds to be processed in a single reactor. The feedstocks can remain separate for the entire volume of the reactor, or the dividing barrier can end at some intermediate point in the reactor.

19 Claims, 7 Drawing Sheets

US 8,609,912 B2

PROCESSING OF FEEDSTOCKS IN SEPARATED REACTOR VOLUMES

This application claims the benefit of U.S. Provisional Application No. 61/443,513 filed Feb. 16, 2011.

FIELD OF THE INVENTION

This invention relates to methods and structures for hydroprocessing of multiple feeds within a reactor.

BACKGROUND OF THE INVENTION

A reactor within a refinery can have a lifetime of decades if properly maintained. Predicting the valuable uses for such a reactor during that time period, however, is difficult at best. Changes in customer demand can make it desirable to produce alternative products. Regulatory changes can also impact the desired output for a refinery, due to tightening of allowed limits for contaminants and/or requirements to incorporate new types of materials into petroleum products.

Regulations related to renewable fuels provide an example of how product requirements can change over time. During the next decade, the United States, Canada, and the European Union have decided to increase and/or are likely to increase the required amount of product from renewable sources that is contained in transportation fuels. Based on such regulatory requirements, fuels for vegetable, animal, or algae sources such as "biodiesel" will become increasingly important as a refinery product. As a result, methods are needed that will allow existing refinery equipment to produce suitable transportation fuels that incorporate increasing amounts of renewable components.

U.S. Patent Application Publication No. 2010/00307052 describes an integrated biofuel process for converting a lignocellulosic material into an energy source. A reactor suitable for the conversion is described as having concentric tubes. The tubes can be packed with a suitable catalyst. An initial feedstock and hydrogen can be introduced at the top of the interior tube. The bottom of the interior tube is in fluid communication with the bottom of the exterior tube. Excess hydrogen and desired fuel gases can exit from the top of the exterior tube.

U.S. Patent Application Publication No. 2009/0166256 describes a method for staged co-processing of biocomponent feeds. A mineral hydrocarbon feed, such as a vacuum gas oil, can be hydroprocessed in a first reaction stage. A biocomponent feed can be added after the first reaction stage for co-processing in a second hydroprocessing reaction stage. The method can al low for deoxygenation of the biocomponent feed in an existing reactor while still allowing for desulfurization of a mineral feed to a desired level.

SUMMARY OF THE INVENTION

In one aspect of the invention, a method is provided for producing a distillate boiling range product. The method includes introducing a first feed and a second feed into a reactor having a reactor volume, the reactor volume optionally but preferably including a first volume and a separated volume, the second feed including at least 20% by volume of a biocomponent feedstock. The first feed can be exposed, in the reactor volume (optionally but preferably in the first volume), to a first hydroprocessing catalyst under first effective hydroprocessing conditions to produce a first hydroprocessing effluent. Physical separation of the first feed and the second feed can be maintained in at least a portion of the reactor volume. The second feed can be exposed, in the reactor volume (optionally but preferably in the separated volume), to a second hydroprocessing catalyst under second effective hydroprocessing conditions to produce a second hydroprocessing effluent.

In another aspect of the invention, a method is provided for producing a distillate boiling range product. The method includes introducing a first feed and a second feed into a reactor having a reactor volume, the reactor volume optionally but preferably including a first volume and a separated volume. The first feed can be exposed, in the reactor volume (optionally but preferably in the first volume), to a first hydroprocessing catalyst under first effective hydroprocessing conditions to produce a first hydroprocessing effluent. Physical separation of the first feed and the second feed can be maintained in at least a portion of the reactor volume. The second feed can be exposed, in the reactor volume (optionally but preferably in the separated volume), to a second hydroprocessing catalyst under second effective hydroprocessing conditions to produce a second hydroprocessing effluent. At least a portion of effluent from the reactor can be recycled to form at least one of the first feed or the second feed, the first feed and/or the second feed comprising less than about 50 wt % of recycled effluent.

In still another aspect of the invention, a method is provided for producing a distil late boiling range product. The method includes introducing a first feed and a second feed into a reactor having a reactor volume (optionally but preferably including a first volume and a separated volume), the first feed having a nitrogen content that differs from a nitrogen content of the second feed by at least about 100 wppm. The first feed can be exposed, in the reactor volume (optionally in the first volume), to a first hydroprocessing catalyst under first effective hydroprocessing conditions to produce a first hydroprocessing effluent. Physical separation of the first feed and the second feed can be maintained in at least a portion of the reactor volume. The second feed can be exposed, in the reactor volume (optionally in the separated volume), to a second hydroprocessing catalyst under second effective hydroprocessing conditions to produce a second hydroprocessing effluent.

DETAILED DESCRIPTION OF THE EMBODIMENTS

Figure 1:
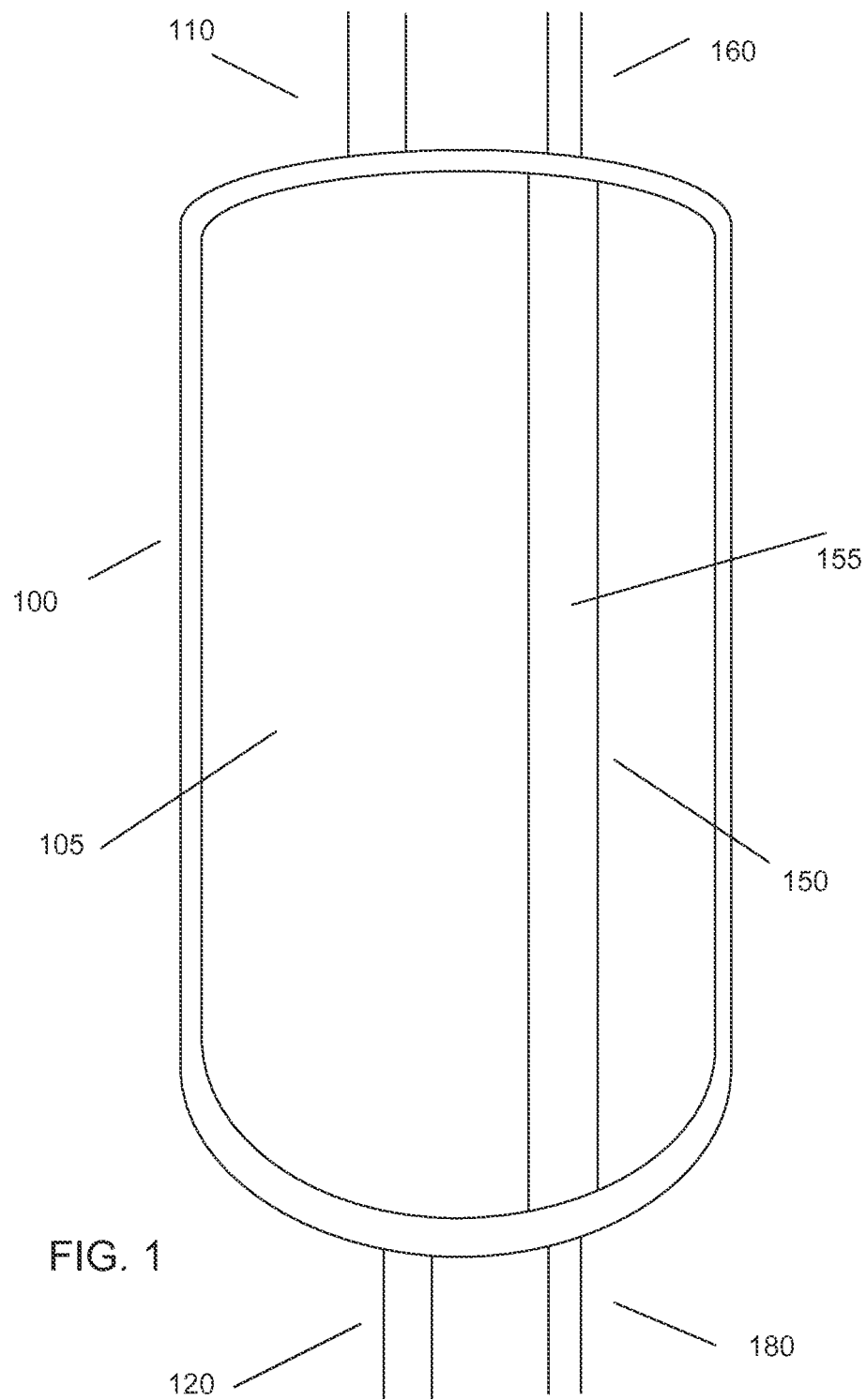
FIG. 1 schematically shows a reactor suitable for performing a process according to an embodiment of the invention.

One way to adapt existing reactors to meet changing requirements can be to co-process multiple feeds within a reactor. However, co-processing of multiple feeds in a hydroprocessing reactor can pose a variety of challenges. For example, feedstocks based on renewable/biological sources, such as feeds containing vegetable (interchangeably used herein to refer to any plant-based sources as well), animal, pyrolysis, and/or algae oils/fats, can contain a substantial amount of oxygen. The oxygen contents of the biological source feedstocks can lead to production of undesirable amounts of byproducts such as CO and/or $CO_2$. The resulting CO and/or $CO_2$ generated from hydroprocessing of the biological source feedstock can cause poisoning of the hydroprocessing catalyst, among other undesirable effects. Furthermore, the product gases generated from such hydroprocessing may have an increased capacity to prematurely corrode hydroprocessing equipment.

In various embodiments, systems and methods are provided for processing multiple types of feeds within a reactor. A dividing barrier can be used to allow multiple feeds to be processed while reducing, minimizing, and/or eliminating the interaction between the feeds and/or products of the feeds. The dividing barrier can, in some embodiments, allow for complete segregation of feeds and products at all stages in the reactor. Alternately, a dividing barrier can be used that allows effluents from reaction to mix at some point prior to exiting the reactor, and/or the dividing barrier can allow the feeds to mix at some point within the reactor. Additionally or alternately, use of a dividing barrier to at least partially separate reactor volumes can allow a single reactor to process multiple feeds while still retaining one or more product characteristics that are typically achieved by processing feeds in separate reactors.

Feedstocks

In the discussion below, a biocomponent feed or feedstock refers to a hydrocarbon feedstock derived from a biological/renewable raw material component, such as vegetable fats/oils, animal fats/oils, fish oils, pyrolysis oils, and algae lipids/oils, as well as components of such materials. In some embodiments, the biofeed can include one or more type of lipid compounds, which are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable (plant) oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable (plant) oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself. Additionally or alternately, algae can be genetically modified to produce oils that are not lipids, e.g., that contain oxygenated hydrocarbons, such as wax esters, fatty ketones, fatty aldehydes, fatty alcohols, and the like. Further additionally or alternately, algae can be genetically modified to produce non-oxygenated hydrocarbons. In such cases, due to the genetic modifications, the algae may indeed exhibit an increased content of oil material and/or such oil material may advantageously have a reduced oxygen content, compared to contents observable and/or attainable in conventional biomass.

Algal sources for algae oils include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactyluim tricornutum, Pleurochrysis carterae, Prymnesium parvum, Tetraselmis chui*, and *Chlamydomonas reinhardtii*. Additional or alternate nonlimiting examples of algae can include, but are not limited to, *Achnanthes, Amphiprora, Amphora, Ankistrodesmus, Asteromonas, Boekelovia, Borodinella, Botryococcus, Bracteococcus, Chaetoceros, Carteria, Chlamydonmonas, Chlorococcum, Chlorogonium, Chlorella, Chroomonas, Chrysosphaera, Cricosphaera, Cryptecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Schizochytrium, Skeletonema, Spyrogyra, Stichococcus, Tetraselmis, Thraustochytrium, Viridiella*, and *Volvox* species.

Other examples of prokaryotic organisms (whether wild-type or genetically modified), which include cyanobacterial species, from which oils qualifying as algae oils herein can be isolated/derived can include, but are not limited to, one or more of the following species: *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermosis, Cylindrospermum, Dactylococcopsis,*

*Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Synploca, Synechococcus, Synechocystis, Tolypothrix, Trichodesmium, Tychonema,* and *Xenococcus.*

Other biocomponent feeds usable in the present invention can include any of those which comprise primarily triglycerides and free fatty acids (FFAs). Free fatty acids can exist in acid form and/or in an at least partially ionic form where the hydrogen atom on the carboxylic acid group can be substituted by a carboxylate counterion, such as a soap-forming counterion (for example, including a counterion such as an ammonium ion, a mono-, di-, tri-, or tetra-alkyl ammonium ion, an alkaline earth metal ion, or a transition metal ion). The soap-forming counterion can include, but is not limited to, a multivalent counterion, such as a divalent counterion source; for example, the counterion can comprise magnesium, calcium, strontium, chromium, manganese, iron, cobalt, nickel, copper, zinc, aluminum, or a combination thereof. The triglycerides and FFAs typically contain aliphatic hydrocarbon chains in their structure having from 8 to 36 carbons, for example from 10 to 26 carbons, from 12 to 24 carbons, or from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, as mentioned herein, it should be understood that the fatty acid component does not necessarily contain a carboxylic acid hydrogen. In one embodiment, a majority of triglycerides present in the biocomponent feed can be comprised of $C_{12}$ to $C_{18}$ fatty acid constituents, based on total triglyceride content. Other types of feed derived from biological raw material components can include fatty acid esters, such as fatty acid alkyl esters (e.g., FAME and/or FAEE), wax esters, fatty aldehydes, fatty alcohols, alkenes, alkanes, and combinations thereof.

In an embodiment, the feedstock can include at least about 5% by weight of glycerides, lipids, free fatty acids, fatty acid esters (such as fatty acid alkyl esters and/or wax esters), or a combination thereof. The glycerides can include monoglycerides, diglycerides, and/or triglycerides. Preferably, the feedstock can include at least about 5 wt %, for example at least about 10 wt % or at least 20 wt %, of glycerides, lipids, fatty acids, fatty acid esters, or a combination thereof. Additionally or alternatively, the feedstock can include about 55 wt % or less, for example about 35 wt % or less, about 25 wt % or less, or about 20 wt % or less, of glycerides, lipids, fatty acids, fatty acid esters, or a combination thereof. For example, the feedstock can include glycerides and/or fatty acid esters, such as triglycerides, fatty acid methyl esters, or a combination thereof.

In an embodiment, the biocomponent portion of the feedstock (such as the glycerides and/or fatty acid esters) can be a non-hydrotreated portion. A non-hydrotreated feed can typically have an olefin content and an oxygen content similar to the content of the corresponding raw biocomponent material. Examples of suitable biocomponent feeds can include food grade vegetable (plant) oils, and biocomponent feeds that are refined, bleached, and/or deodorized.

Biocomponent based diesel boiling range feedstreams can have a wide range of nitrogen and/or sulfur contents. For example, a biocomponent based feedstream based on a vegetable oil source can contain up to about 300 wppm nitrogen. In contrast, a biomass based feedstream containing whole or ruptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, or about 10 wppm or less.

Aside from nitrogen and sulfur, oxygen can be another heteroatom component present in biocomponent based feeds. A biocomponent diesel boiling range feedstream based on a vegetable (plant) oil, prior to hydrotreatment, can include up to about 10 wt % oxygen, for example up to about 12 wt % or up to about 14 wt %. Additionally or alternately, such a biocomponent diesel boiling range feedstream can include at least about 1 wt % oxygen, for example at least about 1.5 wt %, at least about 2 wt %, at least about 3 wt %, at least about 4 wt %, at least about 5 wt %, at least about 6 wt %, or at least about 8 wt %. Further additionally or alternately, a biocomponent feedstream, prior to hydrotreatment, can include an olefin content of at least about 3 wt %, for example at least about 5 wt % or at least about 10 wt %.

A mineral hydrocarbon feedstock refers to a conventional (e.g., non-biocomponent) hydrocarbon feedstock, typically derived from crude oil and that has optionally been subjected to one or more separation and/or other refining processes. In one preferred embodiment, the mineral hydrocarbon feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof.

Mineral feedstocks for blending with a biocomponent feedstock can have a nitrogen content from about 50 wppm to about 2000 wppm nitrogen, for example from about 50 wppm to about 1500 wppm or from about 75 to about 1000 wppm and/or a sulfur content from about 100 wppm to about 10000 wppm sulfur, for example from about 200 wppm to about 5000 wppm or from about 350 wppm to about 2500 wppm. Additionally or alternately, the combined (biocomponent plus mineral) feedstock can have a sulfur content of at least about 5 wppm, for example at least about 10 wppm, at least about 25 wppm, at least about 100 wppm, at least about 500 wppm, or at least about 1000 wppm. Further additionally or alternately, the combined feedstock can have a sulfur content of about 2000 wppm or less, for example about 1000 wppm or less, about 500 wppm or less, about 100 wppm or less, or about 50 wppm or less. Still further additionally or alternately, the nitrogen content of the combined feedstock can be about 1000 wppm or less, for example about 500 wppm or less, about 100 wppm or less, about 50 wppm or less, about 30 wppm or less, about wppm or less, or about 10 wppm or less.

The content of certain compounds such as sulfur, nitrogen, oxygen, and olefins in a feedstock created by blending two or more feedstocks can typically be determined using a weighted average based on the blended feeds. For example, a mineral feed and a biocomponent feed can be blended, for example, in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Diesel boiling range feedstreams suitable for use in the present invention tend to boil within the range from about 215° F. (about 102° C.) to about 800° F. (about 427° C.). Preferably, the diesel boiling range feedstream can have an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Additionally or alternately, the diesel boiling range feedstream can have a final boiling point of about 800° F. (about 427° C.) or less, for example about 775° F. (about 413° C.) or less or about 750° F. (about 399° C.) or less. In some embodiments, the diesel boiling range feedstream can have a boiling range from about 451° F. (about 233° C.) to about 800° C. (about 427° C.). Additionally or alternately, the feedstock can be characterized by the boiling point required to boil a specified percentage of the feed. For example, the temperature required to boil at least 5 wt % of a feed is referred to as a "T5" boiling point and/or a 5 LV % point. In one embodiment, the mineral oil feedstock can have a T5 boiling point of at least about 230° F. (about 110° C.), for example at least about 250° F. (about 121° C.) or at least about 275° F. (about 135° C.). Further additionally or alternately, the mineral hydrocarbon feed can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

In some alternative embodiments, a feedstock with a lower boiling range may be processed within a separate volume in a reactor, such as a naphtha boiling range feed and/or a kerosene boiling range feed. A naphtha feed can have an initial boiling point, or alternately a T5 boiling point, of at least about 50° F. (about 10° C.) or at least about 68° F. (about 20° C.). A naphtha feed can have a final boiling point, or alternately a T95 boiling point, of about 450° F. (about 232° C.) or less, for example about 400° F. (about 204° C.) or less or about 350° F. (about 177° C.) or less. A kerosene feed can have an initial boiling point, or alternately a T5 boiling point, of at least about 215° F. (about 102° C.), for example at least about 250° F. (about 121° C.) or at least about 300° F. (about 149° C.). Additionally or alternately, a kerosene feed can have a final boiling point, or alternately a T95 boiling point, of about 575° F. (about 302° C.) or less, for example about 550° F. (about 288° C.) or less, about 500° F. (about 260° C.) or less, or about 450° F. (about 232° C.) or less. Note that the above T5 and T95 boiling points for kerosene feeds could additionally or alternately apply to jet fuel feeds.

Physical Separation of Reaction Volumes for Hydroprocessing

In some embodiments, multiple feedstocks can be hydroprocessed within a reactor where the multiple feedstocks remain physically separated for the full reactor volume. In other words, physical separation of the multiple feedstocks can be maintained until after the effluents from processing the multiple feedstocks are at or beyond the exit of the reactor. One way of viewing such embodiments is that they provide a "reactor within a reactor" type configuration. For example, a first reactor can have a reactor volume. A pipe or other internal reactor structure can be used to isolate or segregate a portion of the reactor volume. This can result in the reactor volume including a first reaction volume outside of the pipe and a separated reaction volume inside of the pipe. The pipe or internal reactor structure can intersect the walls of the reactor at any convenient locations. One possibility can be to have a pipe aligned concentrically with the axis corresponding to the direction of flow in the reactor. Alternately, one or more pipes (to create multiple separated volumes) can be offset from the central axis of a reactor. Additionally or alternately, there can be an internal reactor structure that enters and/or exits the reactor via a sidewall. For example, existing manways in a reactor could be converted into inlet and/or outlet conduits for an internal structure in the reactor.

A pipe or conduit within the reactor can be constructed of any suitable materials for withstanding the hydroprocessing conditions inside of the reactor. In some embodiments, a pipe or conduit within the reactor volume can be exposed to hydroprocessing conditions on both the inside and the outside of the conduit. Such a conduit can be constructed from a material that can withstand the reaction conditions, or the conduit can have a coating or cladding layer, e.g., on both the inside and the outside, to withstand the reactor conditions. Suitable materials for the conduit, for example, can be similar to materials used for constructing the reactor.

The diameter of a conduit within a reactor can be selected to provide a desired volume for separate processing within a reactor. For example, a hypothetical reactor can be considered that has an internal diameter of about 10 feet (about 3.0 m) and a height of about 30 feet (about 9.1 m). Such a reactor can be modified to have a first reaction volume and a separated reaction volume, e.g., by adding a conduit with an inner diameter of about 2 feet (about 0.6 m). If the conduit has a wall thickness of about 3 inches (about 8 cm), the outer diameter of the conduit can be about 2.5 feet (about 0.75 nm). In this hypothetical example, the total reactor volume can be about 5300 ft$^3$ (about 150 m$^3$). After inserting the conduit with the inner diameter of about 2 feet, two reaction volumes are formed. One reaction volume can correspond to the interior of the conduit, which has a volume of about 94 ft$^3$ (about 2.7 mu$^3$). The other reaction volume has a volume of about 2210 ft$^3$ (about 62.6 m$^3$). The thickness of the conduit pipe can account for the slight loss in total reaction volume for the two reaction volumes. Note that, for convenience, the larger reaction volume in this example could be referred to as a first volume, while the smaller reaction volume could be referred to as a separated volume. However, such a designation is not required based on relative sizes of the reaction volumes. Alternately, the volume within the pipe could be referred to as the first volume, while the larger volume outside of the pipe could be the separated volume.

In the above example, the separated volume within the conduit pipe corresponds to about 0.2% of the total reactor volume. In various embodiments, a separated volume can be formed that incorporates at least about 0.025% of the total reactor volume, for example at least about 0.05%, at least about 0.1%, at least about 0.2%, at least about 0.5%, at least about 1.0%, or at least about 2.0%. Additionally or alternately, a separated volume can be formed that incorporates about 40% of the reactor volume or less, for example about 30% of the reactor volume or less, about 20% of the reactor volume or less, about 10% of the reactor volume or less, about 5.0% of the reactor volume or less, or about 2.0% of the reactor volume or less. It is contemplated in any of these embodiments that more than one conduit can be included in a reactor, such that any number of desired separated volumes can be created.

A reactor configuration where multiple feedstocks remain physically separated can allow the multiple feedstocks to be hydroprocessed without significant chemical interaction between the feedstocks. This can include preventing chemical reactions between a feedstock and/or catalyst outside of the internal reactor structure and the feedstock and/or catalyst within the internal reactor structure. However, other interactions such as heat transfer can still occur between the feedstocks, e.g., via the walls of the internal reactor structure.

An example of hydroprocessing multiple feedstocks with physical separation for the entire reactor volume can be processing of a mineral feedstock and a biocomponent feedstock (or a feedstock containing a biocomponent feed portion) within a reactor. Various types of hydroprocessing can be beneficial for both mineral and biocomponent feedstocks. For example, many types of mineral feedstocks and biocomponent feedstocks can benefit from processing under effective hydrotreatment conditions, such as conditions suitable for desulfurization of a mineral feedstock. Depending on the feedstock, catalytic dewaxing, aromatic saturation, and/or hydrofinishing conditions could also be suitable for both mineral and biocomponent feedstocks.

Due to differences in the composition of the feedstocks, hydroprocessing of a biocomponent feedstock (or a feedstock containing a biocomponent feed portion) can result in different types of products than a mineral feedstock. For example, biocomponent feedstocks can have an increased tendency to produce CO, $CO_2$, and $H_2O$ as by-products during hydroprocessing. This can be due in part to the oxygen content of a biocomponent feed that has not been previously hydrotreated, as biocomponent feeds often have a greater oxygen content than mineral feeds. The by-products from hydroprocessing of a biocomponent feed can pose a variety of challenges. For instance, the CO generated from hydroprocessing of a biocomponent feed can act as a catalyst poison for a hydroprocessing catalyst. Additionally or alternatively, the combination of carbon oxides and water generated by hydroprocessing of a biocomponent feed can increase the likelihood/amount of corrosion experienced by equipment downstream from the hydroprocessing reaction zone.

Another potential challenge in processing a biocomponent feedstock (or a feedstock containing a biocomponent feed portion) can include fouling of the catalyst bed. Due to their biological origin, biocomponent feeds can have a large number of functional groups per molecule relative to a conventional mineral feed of a similar boiling point. These functional groups can include olefinic groups, ether linkages, ester linkages, and/or other potentially reactive groups. As the temperature of a biocomponent feed increases, there can be an increased tendency for the functional groups to react with each other, possibly forming higher molecular weight compounds, which could lead to fouling of catalyst beds. Additionally or alternatively, the reactivity of such functional groups can lead to localized areas that may be hydrogen deficient, which can increase the probability of the formation of coke on the catalyst particles.

Hydroprocessing a biocomponent feedstock (or a feed containing a biocomponent feed portion) and a mineral feedstock in a reactor while maintaining physical separation of the feeds can overcome some of the challenges in processing the multiple feeds. Physically separating the feedstock containing the biocomponent feed portion from the mineral feedstock for the entire reactor volume can allow the products or effluent from hydroprocessing to also remain separate. This can avoid, for example, poisoning of the catalyst used to process the mineral feed by the carbon oxides generated from the biocomponent feed. The physical separation can also allow the products from the biocomponent feed to pass into a separate product separator. This can allow, for example, the desirable products from the biocomponent feed to be separated from the by-product gases in a separator suitable for handling higher corrosion conditions. For example, a gas-liquid separator with high-nickel alloy interior surfaces can be used to mitigate corrosion that may be caused by the corrosive by-products.

One option for using a separate volume to process a feedstock containing a biocomponent feed portion can be to reduce the oxygen content of the feedstock to a level compatible with further processing in conventional hydroprocessing equipment and/or other conventional refinery equipment. In an embodiment, prior to hydroprocessing the feedstock containing the biocomponent feed portion can have an oxygen content of at least about 1.2 wt %, for example at least about 1.5 wt %, at least about 2.0 wt %, at least about 2.5 wt %, at least about 3.0 wt %, at least about 5.0 wt %, or at least about 7.5 wt %. Additionally or alternatively, after hydroprocessing, the effluent from the feedstock containing the biocomponent feed portion can have an oxygen content of about 3.5 wt % or less, for example about 3.0 wt % or less, about 2.0 wt % or less, about 1.0 wt % or less, about 0.5 wt % or less, about 0.2 wt % or less, or about 0.1 wt % or less.

Additionally or alternatively, hydroprocessing while maintaining physical separation of multiple feeds can provide advantages for processing conditions. Deoxygenation of a biocomponent feed can often require less severe hydroprocessing conditions than hydrodesulfurization of a mineral feed. As a result, the biocomponent feed can be introduced into the reactor at a lower temperature, which can mitigate fouling of the catalyst bed. The physical separation can further additionally or alternatively allow different processing atmospheres to be used for the reactions. For example, the processing of the biocomponent feed can be performed at a relatively low partial pressure of hydrogen, which can modify the resulting by-products from the deoxygenation reaction. Of course, the physical separation can still further additionally or alternatively allow different catalysts to be used for processing of the mineral and biocomponent feeds. Still other variations can include selecting different hydrogen treat gas rates, different space velocities, different directions of flow within the separate volumes, or any combination of features described herein.

Further additionally or alternatively, hydroprocessing a biocomponent feed and mineral feed while maintaining physical separation of the feeds can overcome problems that can arise from stand-alone processing of biocomponent feeds. Deoxygenation of a biocomponent feed can be highly exothermic. Conventionally, one of the benefits of co-processing a biocomponent feed with a mineral feed is that the co-processing can mitigate the temperature increase caused by the deoxygenation reaction. In various embodiments, the reactor internal structure (such as a conduit) used for hydroprocessing of a biocomponent stream can pass through one or more catalyst beds for hydroprocessing of a mineral stream. The hydroprocessing environment for the mineral feed can, in some embodiments, act as a heat bath for the hydroprocessing of the biocomponent stream, which can help in stabilizing the temperature for the biocomponent feed processing. This can allow a biocomponent feed with a higher concentration of biocomponent material to be processed while avoiding excessive temperature increases.

It is noted that the types of hydroprocessing performed do not have to be related when multiple feeds remain physically separated within a reactor for the entire reactor volume. For example, due to shifts in product demands, the full capacity of a naphtha reactor may not be needed. A separated volume can be created by adding an internal pipe or conduit to the naphtha reactor. The separated volume within the pipe can then be used for processing a feed that requires a temperature profile similar to naphtha processing. Thus, hydrotreatment of a kerosene feed or a jet fuel feed could be performed in the separated volume. Additionally or alternatively, a hydrotreatment can be performed to at least partially deoxygenate a biocomponent feed. The at least partially deoxygenated biocomponent feed could then be more suitable for further processing in conventional hydrotreating equipment, as a substantial portion of the water and $CO_x$ by-products generated from deoxygenation can be removed.

Still further additionally or alternatively, multiple types of hydroprocessing can be performed within a single reactor. Thus, a hydrotreatment process can be performed in a first reaction volume while the separated volume is used, e.g., to catalytically dewax another feed. Other combinations are also possible, so long as the temperature profile of the separated reaction zone is consistent with the location of the separate reaction zone in the reactor.

After hydroprocessing, a separation device can be used to separate the effluent into a gas phase portion and a liquid phase portion. The separation device can be a separator, a stripper, a fractionator, and/or another device suitable for separating gas phase products from liquid phase products. For example, a separator stage can be used to remove $H_2S$ and $NH_3$ formed during hydrotreatment. A separator stage can optionally further include features such as amine scrubbers that can be used to remove CO and, or $CO_2$ formed during hydroprocessing, such as formed during deoxygenation of a feedstock containing a biocomponent feed portion. Alternately, the entire effluent from a hydroprocessing stage can be cascaded to a subsequent processing stage without separation, if desired.

FIG. 1 shows an example of a hydroprocessing reactor with a physically separated processing volume. In FIG. 1, reactor 100 is a reactor suitable for performing hydroprocessing of a hydrocarbon feed, such as hydrotreatment, hydrocracking, dewaxing, hydrofinishing, and/or another type of hydroprocessing. Reactor 100 includes a first reaction volume 105. The first reaction volume 105 is shown in FIG. 1 as being a single bed reactor. Alternately, two or more reaction beds can be included in the reactor. During hydroprocessing of a feed, the reactants can be introduced into reactor 100 via inlet 110. Alternately, separate inlets can be provided for separate input streams, such as having a separate inlet for hydrogen and a separate inlet for one or more input feedstocks. This could optionally include a separate inlet for a recycle stream as well. The effluent from hydroprocessing can exit via outlet or exit conduit 120, for separation, further processing, and/or any other typical use for the effluent from a hydroprocessing reactor. Reactor 100 also includes a separate reaction volume 155. Separate reaction volume 155 is separated from first reaction volume 105 and defined by the bounds of conduit 150. Although a cylindrically-bound reaction volume is shown in FIG. 1, any convenient shapes can be used for conduit 150 in order to provide a physically separated volume 155 within reactor 100. In FIG. 1, separated volume 155 is not in fluid communication with first volume 105. Therefore, input flows delivered to separated volume 155 via input 160 do not mix with input flows delivered to first volume 105. However, conduit 150 can exchange heat with surrounding first volume 105, including the catalyst bed(s) located in the first reaction volume. Separate reaction volume 155 can be filled with a catalyst that is the same or different from the catalyst in first reaction volume 105. The effluent from processing within separated volume 155 can exit the reactor via outlet or exit conduit 180.

Figure 2:
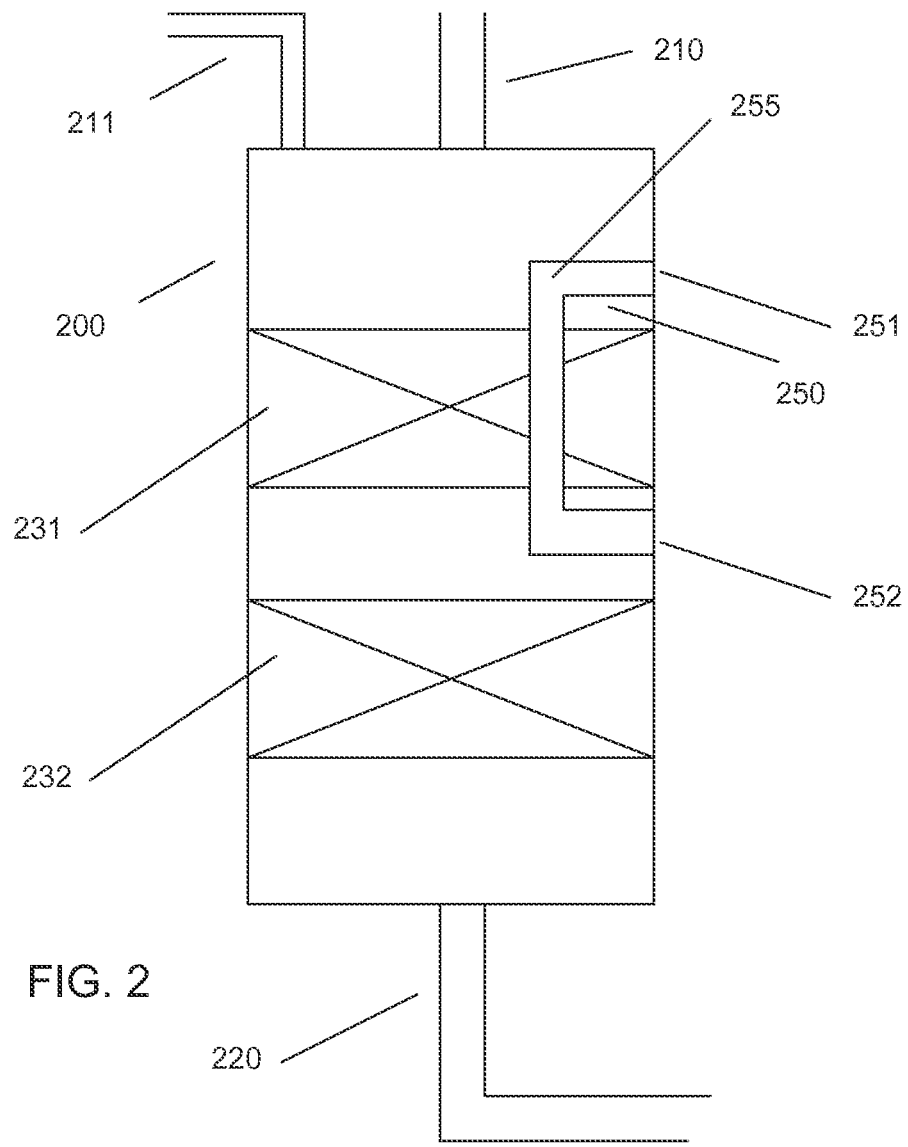
FIG. 2 schematically shows a reactor suitable for performing a process according to an embodiment of the invention.

FIG. 2 schematically shows another example of a reactor 200 with a physically separated reaction volume 255. In FIG. 2, the physically separated reaction volume 255 can be formed by installing a conduit 250 that intersects with the wall of reactor 200 at two intermediate points of the reactor. The location for the conduit inlet 251 and/or exit 252 can be, for example, an existing manway for the reactor 200. In the example shown in FIG. 2, reactor 200 includes two catalyst beds 231 and 232. Conduit inlet 251 is shown as entering reactor 200 above catalyst bed 231 while conduit exit 252 is located between catalyst beds 231 and 232. This can allow heat exchange between conduit 250 and catalyst bed 231 during operation. Feedstock inlet 210 and hydrogen inlet 211 can provide the inputs for hydroprocessing using catalyst beds 231 and 232. The effluent from hydroprocessing using catalyst beds 231 and 232 exits the reactor via outlet 220.

It is noted that a configuration somewhere in between FIGS. 1 and 2 can be contemplated. For instance, in such an intermediate embodiment, either of the conduit inlet or outlet, but not both, can be oriented to intersect with the wall of the reactor, while the other of the conduit inlet or outlet can be oriented around the top or bottom of the reactor, as appropriate.

Partial Physical Separation of Reaction Volumes for Hydroprocessing

In another type of embodiment, multiple feedstocks can be processed in a reactor where multiple feedstocks are partially separated by a physical barrier during processing. In this type of embodiment, multiple feedstocks can be introduced into a reactor. The feedstocks can initially be physically separated such as by having one of the feedstocks introduced into a first reaction volume, while the other feedstock can be introduced into a separated volume, such as the interior of a conduit. However, prior to exiting the reactor, the hydroprocessed or partially hydroprocessed feeds can be combined. The (partially) hydroprocessed feeds can be combined at an intermediate point in the reactor, or at a point downstream from hydroprocessing within the reactor. In a reactor with multiple reaction zones, the (partially) hydroprocessed feeds can be combined after the final reaction zone or in between two reaction zones. Alternately, the (partially) hydroprocessed feeds can be combined after the final catalyst bed or in between two catalyst beds. One option can be to combine the flow from the partially separated volume with the flow from the rest of the reactor at a flow distributor within the reactor.

Partial physical separation of a feed can be useful for situations where interaction of feeds and/or the by-products from processing of feeds can be detrimental to the initial stages of hydroprocessing. For example, biocomponent feeds can have a greater tendency to foul a catalyst bed at higher temperatures. A separate reaction volume can be used to introduce a biocomponent feed at a lower temperature, for example, thus reducing the potential for fouling of the catalyst exposed to the biocomponent feed. A mineral feed in the corresponding first reaction volume can be hydroprocessed at a higher temperature for a desired level of sulfur removal. The feeds can then be combined prior to exiting the reactor for further processing. Note that using partial physical separation, the contaminants generated by a biocomponent feed can still mix with the mineral feed and/or hydroprocessed effluent, possibly leading to some increased corrosion in downstream components and/or some poisoning of a portion of the catalyst in the first reaction volume.

Additionally or alternately, partial physical separation can be utilized to allow initial processing conditions to vary for multiple feeds. For biocomponent feeds, the mechanism for deoxygenation of a feed may vary depending on the partial pressure and/or treat gas rate of hydrogen (inter alia) in the reaction environment. Processing a biocomponent feed in a separate volume can allow for hydrotreatment of the biocomponent feed in a separated volume at a different hydrogen treat gas ratio and/or partial pressure from a mineral feed in a first reaction volume. After one or more reaction zones of hydroprocessing, the biocomponent and mineral feed portions can be combined for further processing. An example of further processing can be passing the combined effluent into a separator for separation into a gas phase portion and a liquid phase portion. In such an example, the liquid phase portion can then optionally undergo additional hydroprocessing, and/or the liquid phase portion may be suitable for use as a fuel product.

Further additionally or alternately, partial physical separation can be utilized to handle feeds with different contaminant levels. For example, a higher nitrogen content feed and a lower nitrogen content feed can be processed in the separate reaction volumes. Nitrogen is a known contaminant that can suppress catalyst activity. By processing a higher nitrogen feed in a separate reaction volume, the catalyst in the separated volume can be selected for improved nitrogen removal, while a higher purity hydrogen feed can be used to further enhance nitrogen removal, for example. After initial hydrotreatment to reduce nitrogen levels, the hydroprocessed feed from the separated volume can be combined with a lower nitrogen feed in the first reaction volume that was initially processed, e.g., under conventional hydroprocessing conditions. Alternately, the higher nitrogen feed can be in the first reaction volume, while the separated volume can be used for hydrodeoxygenation of a feed that includes a biocomponent portion.

Some biocomponent feeds produce an increasing amount of CO and/or $CO_2$ as the nitrogen content is increased during hydrodeoxygenation. Using partial physical separation can allow the initial deoxygenation to occur with reduced nitrogen contamination, which can lead to a corresponding reduction in the amount of carbon oxides generated. In various embodiments, the amount of difference in nitrogen content between feeds processed in the separate volumes can be at least about 50 wppm, for example at least about 100 wppm, at least about 250 wppm, at least about 500 wppm, or at least about 1000 wppm. Additionally or alternately, the difference in nitrogen content between feeds can be characterized by a difference in basic nitrogen. In various embodiments, the amount of difference in basic nitrogen content between feeds processed in the separate volumes can be at least about 25 wppm, for example at least about 50 wppm, at least about 100 wppm, at least about 250 wppm, or at least about 500 wppm.

Still further additionally or alternately, the partially separated volume can be utilized to improve the product quality of a feed. For example, a hydrotreatment reactor for producing (diesel) fuel may be limited in the types of feeds that can be used while still meeting the cloud point and/or other required cold flow properties for the (diesel) fuel. A partially or completely separated volume can be added to the interior of a (diesel) hydrotreatment reactor. The separate volume can incorporate a dewaxing catalyst, for example. A portion of the hydrotreated effluent from the hydrotreater can then be recycled to the inlet for the separated volume for catalytic dewaxing. Using a portion of the interior of the reactor to dewax a recycle feed can reduce the overall daily output for the reactor. However, this potential reduction in overall output may be desirable in order to increase the range of feeds that can be processed, e.g., while still meeting desired cold flow properties. The potential amount of recycle can be controlled in any one or more of several ways. For instance, aside from or in addition to varying the amount of volume inside the conduit containing the dewaxing catalyst, the space velocity for the feed in the separate volume can be modified. As indicated hereinabove, an inverse arrangement is alternately contemplated; for example, the dewaxing catalyst can alternately be present in the first reactor volume, while the (diesel) hydrotreatment catalyst can be present in the separated volume.

In some embodiments, partial physical separation can be achieved by segregating the initial introduction of feeds into a first catalyst bed in a reactor. For example, when feeds are introduced into a reactor, the feeds can first encounter a flow distributor such as a distributor tray. The flow distributor can allow feed to be introduced into the reactor using a conduit that is smaller in diameter than the reactor while still allowing the feed to be better distributed over the full area of the catalyst bed. In an embodiment, the flow distributor at the top of the reactor can be partitioned so that feeds introduced on one side of the partition do not substantially interact with feeds on the other side. Any convenient partition can be used, such as a partition that forms a chord across the circular profile of the flow distributor. Different feeds can then be introduced on either side of the partition.

As an example, a biocomponent feed can be introduced on one side of the flow distributor partition, while a higher nitrogen, higher boiling point mineral feed can be introduced on the other side. Because of the partition, the two feeds should undergo little or no mixing prior to contacting the catalyst bed. To further prevent mixing prior to entering the catalyst bed, the partition from the flow distributor can optionally extend down toward and/or into the catalyst bed.

Although the overall processing conditions should typically be relatively similar, because of the partition, the initial reaction conditions can be different for the two feeds. Thus, for example, the biocomponent feed can be introduced into the reactor at a colder temperature than the mineral feed. Similarly, the nitrogen from the mineral feed will not be initially present to modify and/or suppress the deoxygenation reactions for the biocomponent feed. As the feeds continue downstream in the reactor past the end of the partition, mixing of the feeds may increase, potentially leading to a situation more similar (approaching equivalence) to conventional co-processing of the feeds.

It is noted that, if less (e.g., no) or less severe processing was needed for the second feed, a second feed could simply be introduced at an intermediate location in a reactor. For example, a high nitrogen mineral feed could be introduced into the top of a reactor, e.g., and undergo an initial hydroprocessing stage. After the initial hydroprocessing, a second feed, such as a biocomponent feed, could be introduced downstream from the first reaction zone. The combined feed could then be subsequently processed in the reactor. This type of configuration could avoid the difficulty of processing a biocomponent feed in the presence of a high nitrogen feed, while still allowing for co-processing of the feeds in a single reactor that contains only a single reaction volume. It is noted that, in this type of configuration, less (no) hydroprocessing of the biocomponent feed can take place in a separated volume within the reactor. Still another option can be to introduce a biocomponent feed into the top of a reactor and to introduce a mineral feed downstream from the first reaction zone. This type of configuration can be useful, for example, for processing the biocomponent feed at a lower hydrogen treat gas ratio. Additional hydrogen can then be added, if desired, after the first reaction zone, e.g., along with the mineral feed, to achieve a more typical ratio of hydrogen to feed.

Figure 3:
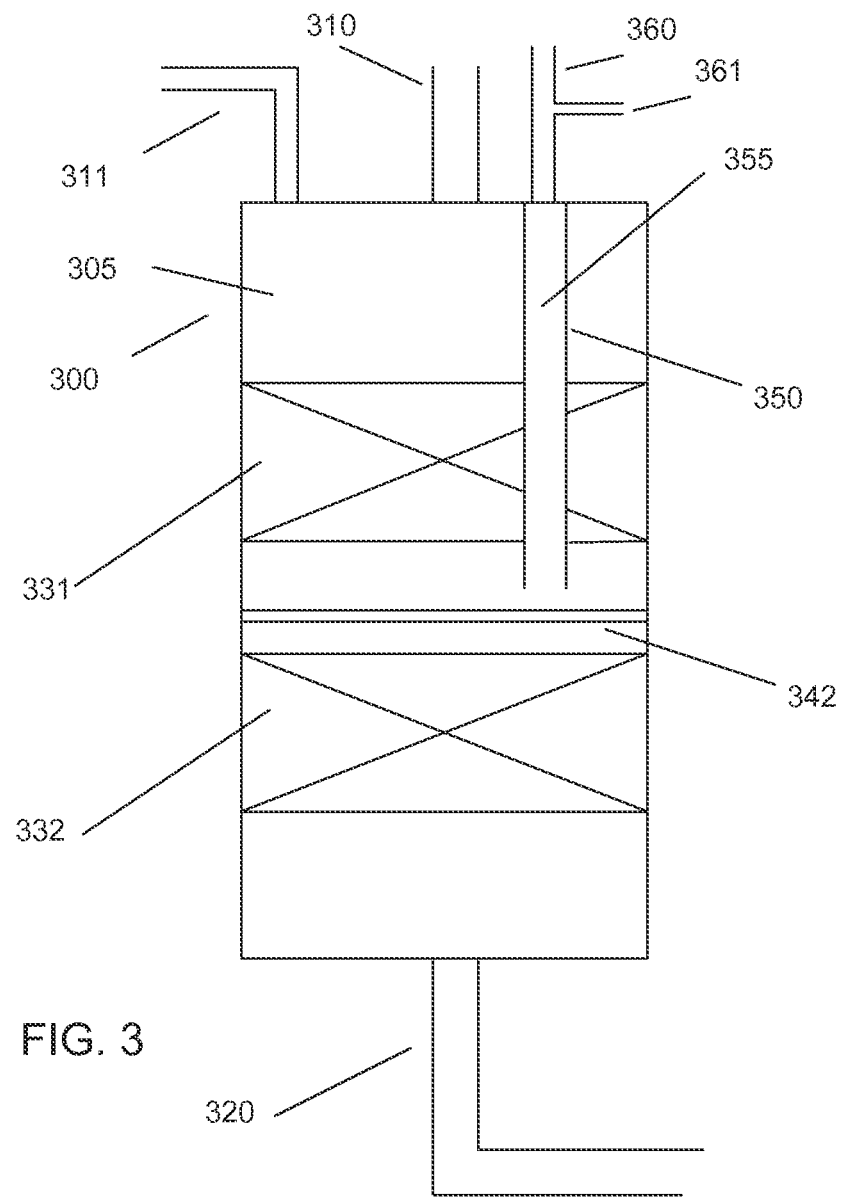
FIG. 3 schematically shows a reactor suitable for performing a process according to an embodiment of the invention.

FIG. 3 schematically shows an example of partial physical separation in a hydroprocessing reactor. In FIG. 3, a conduit 350 within reactor 300 is used to provide the partial physical separation. Feed inlet 310 can provide feedstock to first reaction volume 305, while feed inlet 360 can provides feedstock to separated volume 355. Note that a flow distributor (not shown) may optionally be included prior to catalyst bed 331 to assist with evenly distributing feed from feed inlet 310. An optional flow distributor (not shown) could additionally or alternately be included inside separated volume 355. Hydrogen (and other gases) can be introduced into first reaction volume 305 via inlet 311, while inlet 361 can add hydrogen to feed inlet 360 for introduction into separated volume 355. In FIG. 3, conduit 350 can maintain separate physical volume 355 past first catalyst bed 331. In this embodiment, feed processed in separated volume 355 does not mix with feed and/or hydroprocessed effluent from first reaction volume 305 until at least flow distributor 342, which is located between catalyst beds 331 and 332. Note that the location of catalyst within separated volume 355 does not need to correspond to the location of catalyst in catalyst bed 331. Depending on the embodiment, any desired portion of separated volume 355 can be filled with catalyst. The effluent from both first catalyst bed 331 and separated reaction volume 355 can then be exposed to second catalyst bed 332, e.g., under hydroprocessing conditions. The resulting effluent can exit the reactor via conduit 320.

Figure 4:
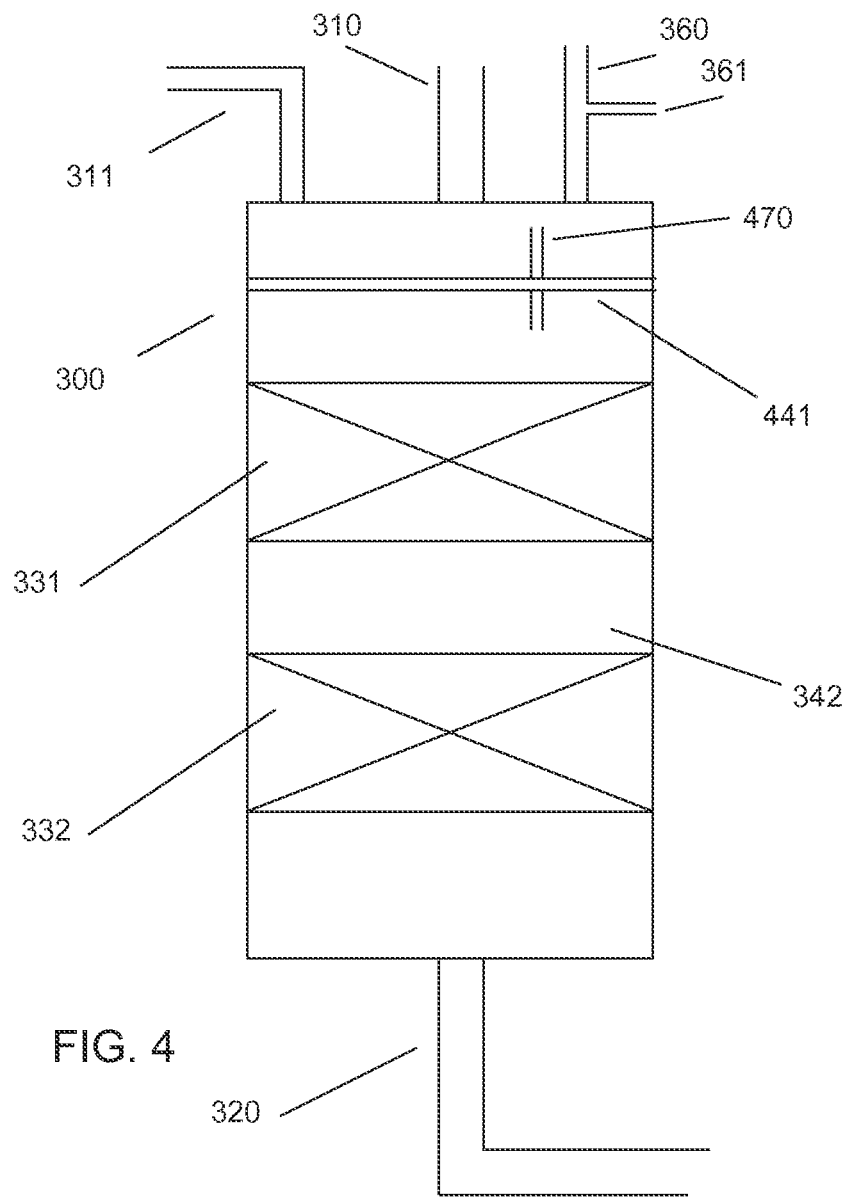
FIG. 4 schematically shows a reactor suitable for performing a process according to an embodiment of the invention.

FIG. 4 schematically shows another example of partial physical separation in a hydroprocessing reactor. The example shown in FIG. 4 is similar to the configuration shown in FIG. 3, except that conduit 350 for partial physical separation has been removed. Instead, in FIG. 4 a dividing wall 470 is used in association with flow distributor 441. This can reduce and/or eliminate mixing of feeds introduced by inlets 310 and 360 until the feeds reach first catalyst bed 331. Dividing wall 470 can represent an annular ring in flow distributor 441, or can be a chord connecting two points on the circumference of flow distributor 441, or can take any appropriately divisive form. As shown in FIG. 4, the dividing wall can optionally extend below the level of flow distributor 441 toward the surface of catalyst bed 331. Note that dividing wall 470 does not need to extend to the top of the reactor above flow distributor 441. In this type of configuration, the hydroprocessing conditions for the first feed and the second feed can be the same, as the partial physical separation in this configuration does not include a hydroprocessing catalyst within a separated volume.

Hydroprocessing Conditions—Hydrotreatment

In various embodiments, at least some of the hydroprocessing conditions in a reactor can be hydrotreatment conditions. A hydrotreatment process can remove heteroatoms such as oxygen, sulfur, and nitrogen from a feedstock. A hydrotreatment process can additionally or alternately saturate olefins.

A hydrotreatment catalyst can contain at least one of Group VIB and Group VIII metals, either in bulk or on a support such as alumina or silica. Examples can include, but are not limited to, NiMo, CoMo, NiW, and NiMoW catalysts. Typical hydrotreating conditions for a diesel feed can include one or more of a temperature from about 300° C. to about 425° C., a pressure from about 200 psig (about 1.4 MPa) to about 3000 psig (about 20.7 MPa), an LHSV from about 0.2 hr$^{-1}$ to about 10 hr$^{-1}$, and a hydrogen treat gas rate from about 500 scf/bbl (about 85 Nm$^3$/m$^3$) to about 10000 scf/bbl (about 1700 Nm$^3$/m$^3$). Alternately, some hydrotreatment processes can be performed under a milder set of conditions, such as at a lower temperature. For example, a hydrotreatment process for deoxygenating a biocomponent feed can be operated at less severe conditions. In alternate embodiments where a less severe hydrotreatment process is desired, the alternate hydrotreating conditions can include a temperature from about 260° C. to about 400° C. or from about 260° C. to about 370° C.

During hydrotreatment, the sulfur and nitrogen contents of a feedstock (particularly a feedstock comprising a mineral portion) can advantageously be reduced. In an embodiment, one or more hydrotreating stages can preferably reduce the sulfur content to a suitable level, such as not more than about 100 wppm, for example not more than about 50 wppm, not more than about 25 wppm, or not more than about 15 wppm. In another preferred embodiment, the hydrotreating stage(s) can reduce the sulfur content of the feed to not more than about 5 wppm, for example not more than about 3 wppm. Additionally or alternately, with regard to nitrogen, the hydrotreating stage(s) can reduce the nitrogen content of the feed to about 20 wppm or less, for example about 10 wppm or less, about 5 wppm or less, or about 3 wppm or less.

Deoxygenating a feed can avoid problems with catalyst poisoning/deactivation due to the creation of water or carbon oxides during hydroprocessing. A hydrotreatment process can also be used to substantially deoxygenate a feedstock, which corresponds to removing at least 90%, for example at least 95%, at least 98%, or at least 99% of the oxygen present in the biocomponent feedstock. Additionally or alternately, substantially deoxygenating the feedstock can correspond to reducing the oxygenate level of the total feedstock to 0.1 wt % or less, for example 0.05 wt % or less, 0.01 wt % or less, or 0.005 wt % or less.

Alternately, a hydrofinishing stage can be used instead of a hydrotreatment stage, and/or to operate a hydrotreatment stage under conditions typically associated with hydrofinishing. In some embodiments, a hydrofinishing stage can be similar to a hydrotreating stage. For example, hydrofinishing can be a mild hydrotreating directed to saturating any remaining olefins and/or residual aromatics. Hydrofinishing conditions can include one or more of a temperature from about 150° C. to about 350° C., for example about 180° C. to about 250° C., a total pressure from about 2.8 MPag (about 400 psig) to about 20.7 MPag (about 3000 psig), an LHSV from about 0.1 hr$^{-1}$ to about 5 hr$^{-1}$, for example about 0.5 hr$^{-1}$ to about 3 hr$^{-1}$, and a hydrogen treat gas rate from about 43 Nm$^3$/m$^3$ (about 250 scf/bbl) to about 1700 Nm$^3$/m$^3$ (about 10000 scf/bbl).

Suitable catalysts for hydrofinishing can include, but are not limited to, hydrotreating catalysts, hydrofinishing catalysts, and/or aromatic saturation catalysts can be used. Examples of sufficient catalysts can include, but are not limited to, those containing a Group VIII and/or Group VIB metal, optionally supported, e.g., on a bound support from the M41S family, such as bound MCM-41. Suitable binders for a support from the M41S family, such as MCM-41, can include alumina, silica, and/or any other binder or combination of binders that can provide a high productivity and/or low density catalyst. One example of a suitable aromatic saturation catalyst can include Pt and/or another metal on alumina bound mesoporous MCM-41. Such a catalyst can be impregnated with a hydrogenation metal such as Pt, Pd, another Group VIII metal, a Group VIB metal, or a mixture of metals thereof. In an embodiment, the amount of Group VIII metal can be at least 0.1 wt % per weight of catalyst, for example at least 0.5 wt % or at least 0.6 wt %. In such embodiments, the amount of metals can additionally or alternately be 1.0 wt % or less, for example 0.9 wt % or less, 0.75 wt % or less, or 0.6 wt % or less. Further additionally or alternately, the amount of metals, either individually or in mixtures, can be at least 0.1 wt %, for example at least 0.25 wt %, at least 0.5 wt %, at least 0.6 wt %, at least 0.75 wt %, or at least 1 wt %. Still further additionally or alternately, the amount of metals, either individually or in mixtures, can be 35 wt % or less, for example 20 wt % or less, 15 wt % or less, 10 wt % or less, or 5 wt % or less.

In an embodiment, the hydrofinishing stage can be performed in the same reactor as the hydrodewaxing, with the same treat gas and at the same temperature. Additionally or alternately, stripping may not occur in some embodiments between the hydrofinishing and catalytic dewaxing stages.

Hydroprocessing—Dewaxing

Catalytic dewaxing relates to the removal and/or isomerization of long chain, paraffinic molecules from feeds. Catalytic dewaxing can be accomplished by selective hydrocracking or by hydroisomerizing these long chain molecules. Hydrodewaxing catalysts can be selected from molecular sieves such as crystalline aluminosilicates (zeolites) or silicoaluminophosphates (SAPOs). In an embodiment, the molecular sieve can be a 1-D or 3-D molecular sieve, such as a 10-member ring 1-D molecular sieve. Examples of molecular sieves can include, but are not limited to, ZSM-48, ZSM-23, ZSM-35, Beta, USY, ZSM-5, and combinations thereof, for example ZSM-48 and/or ZSM-23. Optionally, the dewaxing catalyst can include a binder for the molecular sieve, such as alumina, titania, silica, silica-alumina, zirconia, or a combination thereof. In one embodiment, the binder can be alumina, silica, and/or titania. In another embodiment, the binder can be a hydrothermally stable binder such as titania, silica, and/or zirconia.

One feature of molecular sieves that can impact the activity of the molecular sieve is the ratio of silica to alumina in the molecular sieve. In an embodiment, the molecular sieve can have a silica to alumina ratio of about 200 to 1 or less, for example about 120 to 1 or less, about 100 to 1 or less, about 90 to 1 or less, or about 75 to 1 or less. Additionally or alternately, the molecular sieve can have a silica to alumina ratio of at least about 30 to 1, for example at least about 50 to 1 or at least about 65 to 1.

The dewaxing catalyst can also include a metal hydrogenation component, such as a Group VIII metal. Suitable Group VIII metals can include Pt, Pd, and/or Ni. The dewaxing catalyst can include at least about 0.1 wt % of a Group VIII metal, for example at least about 0.3 wt %, at least about 0.5 wt %, at least about 1.0 wt %, at least about 2.5 wt %, or at least about 5.0 wt %. Additionally or alternately, the dewaxing catalyst can include about 10.0 wt % or less of a Group VIII metal, for example about 5.0 wt % or less, about 2.5 wt % or less, or about 1.5 wt % or less.

In some embodiments, the metal hydrogenation component of the dewaxing catalyst can also include a Group VIB metal, such as W and/or Mo, particularly when the Group VIII metal comprises Ni. In such embodiments, the dewaxing catalyst can include at least about 0.5 wt % of a Group VIB metal, for example at least about 1.0 wt %, at least about 2.5 wt %, or at least about 5.0 wt %. Additionally or alternately, the dewaxing catalyst can include about 20.0 wt % or less of a Group VIB metal, for example about 15.0 wt % or less, about 10.0 wt % or less, about 5.0 wt % or less, about 3.0 wt % or less, or about 1.0 wt % or less. In some embodiments, the metal hydrogenation components of the dewaxing catalyst can include Pt and/or Pd. In other embodiments, the metal hydrogenation components of the dewaxing catalyst can include Ni and W, Ni and Mo, or Ni, W, and Mo.

Catalytic dewaxing can be performed by exposing a feedstock to a dewaxing catalyst under effective (catalytic) dewaxing conditions. Effective dewaxing conditions can include one or more of a temperature of at least about 500° F. (about 260° C.), for example at least about 550° F. (about 288° C.), at least about 600° F. (about 316° C.), or at least about 650° F. (about 343° C.); a temperature of about 750° F. (about 399° C.) or less, for example about 700° F. (about 371° C.) or less or about 650° F. (about 343° C.) or less; a pressure of at least about 400 psig (about 2.8 MPag), for example at least about 500 psig (about 3.4 MPag), at least about 750 psig (about 5.2 MPag), or at least about 1000 psig (about 6.9 MPag); a pressure of about 1500 psig (about 10.3 MPag) or less, for example about 1200 psig (about 8.2 MPag) or less, about 1000 psig (about 6.9 MPag) or less, or about 800 psig (about 5.5 MPag) or less; an LHSV of at least about 0.5 $hr^{-1}$, for example at least about 1.0 $hr^{-1}$ or at least about 1.5 $hr^{-1}$; an LHSV of about 20 $hr^{-1}$ or less, for example about 10.0 $hr^{-1}$ or less, about 5.0 $hr^{-1}$ or less, about 3.0 $hr^{-1}$ or less, or about 2.0 $hr^{-1}$ or less; a hydrogen treat gas rate of at least about 500 scf/bbl (about 85 $Nm^3/m^3$), for example at least about 750 scf/bbl (about 130 $Nm^3/m^3$) or at least about 1000 scf/bbl (about 170 $Nm^3/m^3$); a hydrogen treat gas rate of about 5000 scf/bbl (about 850 $Nm^3/m^3$) or less, for example about 4000 scf/bbl (about 680 $Nm^3/m^3$) or less, about 3000 scf/bbl (about 510 $Nm^3/m^3$) or less, about 2000 scf/bbl (about 340 $Nm^3/m^3$) or less, about 1500 scf/bbl (about 255 $Nm^3/m^3$) or less, or about 1250 scf/bbl (about 213 $Nm^3/m^3$) or less.

A catalytic dewaxing process can modify a feedstock in several ways. Aside from isomerization and/or cracking of a feed, a catalytic dewaxing process can additionally or alternately remove oxygen, e.g., from the biocomponent portion of the feedstock. Olefins in the feedstock can additionally or alternately be at least partially saturated. The dewaxing process can further additionally or alternately improve the cold flow properties of the feed, such as pour point and/or cloud point. Still further additionally or alternately, some sulfur and/or nitrogen removal can occur.

Typical mineral distillate feeds suitable for conversion into a diesel fuel product can have initial cloud points ranging from about −20° C. to about 5° C. The initial cloud point of biocomponent feeds can be higher still, including feeds with an initial cloud point of up to about 20° C. In order to form a suitable diesel fuel product, catalytic dewaxing conditions can be selected to reduce the cloud point by at least about 10° C., for example by at least about 20° C., by at least about 30° C., by at least about 40° C., or by at least about 50° C.

Additional Embodiments

Additionally or alternately, the following embodiments are considered part of the instant invention.

Embodiment 1. A method for producing a distillate boiling range product, comprising: introducing a first feed and a second feed into a reactor having a reactor volume, optionally including a first volume and a separated volume, the second feed including at least 20% by volume of a biocomponent feedstock; exposing the first feed, in the reactor volume (optionally in the first volume), to a first hydroprocessing catalyst under first effective hydroprocessing conditions to produce a first hydroprocessing effluent; maintaining physical separation of the first feed and the second feed in at least a portion of the reactor volume; and exposing the second feed, in the reactor volume (optionally in the separated volume), to a second hydroprocessing catalyst under second effective hydroprocessing conditions to produce a second hydroprocessing effluent.

Embodiment 2. A method for producing a distillate boiling range product, comprising: introducing a first feed and a second feed into a reactor having a reactor volume, optionally including a first volume and a separated volume, the first feed having a nitrogen content that differs from a nitrogen content of the second feed by at least about 100 wppm; exposing the first feed, in the reactor (optionally in the first volume), to a first hydroprocessing catalyst under first effective hydroprocessing conditions to produce a first hydroprocessing effluent; maintaining physical separation of the first feed and the second feed in at least a portion of the reactor volume; and exposing the second feed, in the reactor (optionally in the separated volume), to a second hydroprocessing catalyst under second effective hydroprocessing conditions to produce a second hydroprocessing effluent.

Embodiment 3. The method of embodiment 2, wherein at least a portion of the second feed comprises a biocomponent feedstock.

Embodiment 4. A method for producing a distillate boiling range product, comprising: introducing a first feed and a second feed into a reactor having a reactor volume, optionally including a first volume and a separated volume; exposing the first feed, in the reactor (optionally in the first volume), to a first hydroprocessing catalyst under first effective hydroprocessing conditions to produce a first hydroprocessing effluent; maintaining physical separation of the first feed and the second feed in at least a portion of the reactor volume; exposing the second feed, in the reactor (optionally in the separated volume), to a second hydroprocessing catalyst under second effective hydroprocessing conditions to produce a second hydroprocessing effluent; and recycling at least a portion of effluent from the reactor to form to form at least one of the first feed or the second feed, at least one of the first feed and the second feed comprising less than about 50 wt % of recycled effluent.

Embodiment 5. The method of embodiment 4, wherein the second hydroprocessing catalyst comprises a dewaxing catalyst and the second effective hydroprocessing conditions comprise catalytic dewaxing conditions.

Embodiment 6. The method of embodiment 4 or embodiment 5, wherein the recycled effluent comprises at least a portion of the first hydroprocessing effluent and at least a portion of the second hydroprocessing effluent.

Embodiment 7. The method of any one of embodiments 4-6, wherein the recycled effluent comprises at least a portion of the second hydroprocessing effluent.

Embodiment 8. The method of any one of the previous embodiments, wherein physical separation of the first feed and the second feed are maintained for the entire reactor volume.

Embodiment 9. The method of embodiment 8, wherein the first feed comprises or is a naphtha boiling range feed.

Embodiment 10. The method of any one of the previous embodiments, wherein separation of the first feed and the second feed is maintained in the reactor until the first feed is downstream from at least one flow distributor and/or from at least one catalyst bed.

Embodiment 11. The method of any one of the previous embodiments, wherein the oxygen content of the second feed is greater than about 3 wt %.

Embodiment 12. The method of embodiment 11, wherein the second effective hydroprocessing conditions comprise effective hydrodeoxygenation conditions, the second hydroprocessing effluent comprising a liquid effluent with an oxygen content of less than about 3 wt %.

Embodiment 13. The method of embodiment 11 or embodiment 12, wherein the second hydroprocessing effluent is separated to form a gas phase effluent and a liquid effluent, and wherein the method further comprises: mixing the liquid effluent with a mineral feed to form a mixed feed; and hydroprocessing the mixed feed.

Embodiment 14. The method of any of the above embodiments, wherein the first feed has a basic nitrogen content that differs from the basic nitrogen content of the second feed by at least about 50 wppm.

Embodiment 15. The method of any one of the previous embodiments, further comprising recycling at least a portion of effluent from the reactor to form the first feed, the first feed comprising less than about 50 wt % of recycled effluent.

Additionally or alternately in any of the aforementioned embodiments, effective hydroprocessing conditions can include one or more of effective hydrotreating conditions, effective dewaxing conditions, effective hydrofinishing conditions, and effective hydrodeoxygenation conditions. Effective hydrotreating conditions can include one or more of a temperature from about 300° C. to about 425° C., a pressure from about 200 psig (about 1.4 MPag) to about 3000 psig (about 20.7 MPag), an LHSV from about 0.2 hr$^{-1}$ to about 10 hr$^{-1}$, and a hydrogen treat gas rate from about 500 scf/bbl (about 85 Nm$^3$/m$^3$) to about 10000 scf/bbl (about 1700 Nm$^3$/m$^3$). In alternate embodiments where a less severe hydrotreatment process is desired, the alternative hydrotreating conditions can include a temperature of about 260° C. to about 400° C.

Effective dewaxing conditions can include one or more of: a temperature of at least about 500° F. (about 260° C.), for example at least about 550° F. (about 288° C.), at least about 600° F. (about 316° C.), or at least about 650° F. (about 343° C.); a temperature of about 750° F. (about 399° C.) or less, for example about 700° F. (about 371° C.) or less or about 650° F. (about 343° C.) or less; a reaction pressure of at least about 400 psig (about 2.8 MPag), for example at least about 500 psig (about 3.4 MPag), at least about 750 psig (about 5.2 MPag), or at least about 1000 psig (about 6.9 MPag); a pressure of about 1500 psig (about 10.3 MPag) or less, for example about 1200 psig (about 8.2 MPag) or less, about 1000 psig (about 6.9 MPag) or less, or about 800 psig (about 5.5 MPag) or less; an LHSV of at least about 0.5 hr$^{-1}$, for example at least about 1.0 hr$^{-1}$ or at least about 1.5 hr$^{-1}$; an LHSV of about 20.0 hr$^{-1}$ or less, for example about 15.0 hr$^{-1}$ or less, about 10.0 hr$^{-1}$ or less, or about 5.0 hr$^{-1}$ or less; a hydrogen treat gas rate of at least about 500 scf/bbl (about 85 Nm$^3$/m$^3$), for example at least about 750 scf/bbl (about 130 Nm$^3$/m$^3$) or at least about 1000 scf/bbl (about 170 Nm$^3$/m$^3$); and a hydrogen treat gas rate of about 2000 scf/bbl (about 340 Nm$^3$/m$^3$) or less, for example about 1500 scf/bbl (about 250 Nm$^3$/m$^3$) or less or about 1250 scf/bbl (about 212 Nm$^3$/m$^3$) or less.

Effective hydrofinishing conditions can include one or more of: a temperature from about 150° C. to about 350° C., for example from about 180° C. to about 250° C.; a total pressure from about 2.8 MPag (about 400 psig) to about 20.7 MPag (about 3000 psig); an LHSV from about 0.1 hr$^{-1}$ to about 10 hr$^{-1}$, for example from about 0.5 hr$^{-1}$ to about 3 hr$^{-1}$; and a hydrogen treat gas rate from about 43 Nm$^3$/m$^3$ (about 250 scf/bbl) to about 1700 Nm$^3$/m$^3$ (about 10000 scf/bbl). Effective hydrodeoxygenation conditions can include operating at temperatures from about 150° C. to about 350° C., preferably about 180° C. to about 250° C. Total pressures can be from about 2859 kPa (400 psig) to about 20786 kPa (3000 psig). The Liquid Hourly Space Velocity can be at least about 0.5 hr$^{-1}$, or at least about 1.0 hr$^{-1}$, or at least about 1.5 hr$^{-1}$. Alternatively, the LHSV can be about 20.0 hr$^{-1}$ or less, or about 15.0 hr$^{-1}$ or less, or about 10.0 hr$^{-1}$ or less, or about 5.0 hr$^{-1}$ or less. Hydrogen treat gas rates can be from about 42 m$^3$/m$^3$ (250 scf/bbl) to about 1685 m$^3$/m$^3$ (10,000 scf/bbl).

EXAMPLES

Examples of Hydroprocessing Configurations

Figure 5:
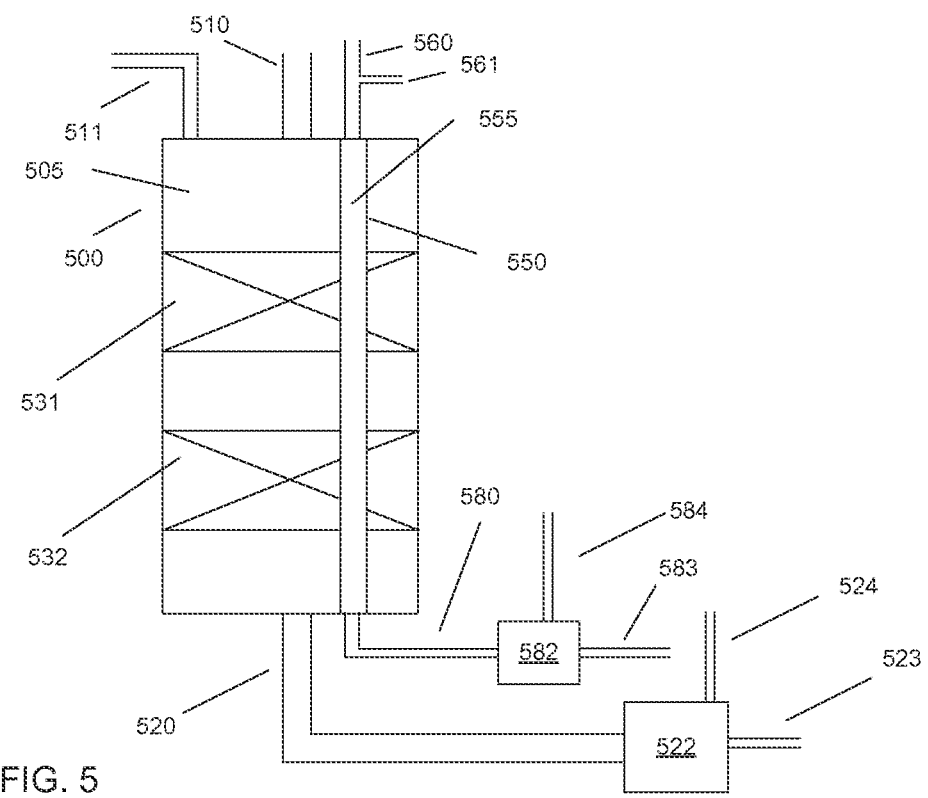
FIG. 5 schematically shows a reaction system suitable for performing a process according to an embodiment of the invention.

FIG. 5 schematically shows a configuration for hydroprocessing of multiple feeds using separated volumes. In FIG. 5, reactor 500 includes a conduit 550 that forms a physically separated volume 555. Physically separated volume 555 in FIG. 5 is not in fluid communication with first reaction volume 505 while inside of reactor 500. Reactor 500 can include feed inlet conduits 510 and 560 for providing feedstock to first reaction volume 505 and separated volume 555, respectively. Reactor 500 can also include gas inlets 511 and 561 for introducing hydrogen and/or other input gases to primary reaction volume 505 and separated volume 550, respectively. First reaction volume 505 can include any convenient number of catalyst beds. FIG. 5 shows a configuration with two catalyst beds 531 and 532, but a single or bed or three or more beds can alternately be used. Similarly, separated volume 555 can include one or more catalyst beds.

After hydroprocessing, effluent from first reaction volume 505 can exit via conduit 520. After an optional separation process 522, liquid phase effluent 523 and gas phase effluent 524 can be used and/or processed in any convenient manner. The effluent from separated volume 555 can exit via conduit 580 and enter optional separation process 582. After optional separation 582, liquid phase effluent 583 and gas phase effluent 584 can be used and/or processed in any convenient manner. One option can be to combine the liquid phase effluents 523 and 583 for further processing. This can allow liquid phase effluent 583 from separator 582 to be processed in an existing process train.

In the embodiment shown in FIG. 5, separator 582 can be configured to handle an effluent from hydrotreatment of a biocomponent feed. The materials for separator 582 can optionally be selected to have improved corrosion resistance relative to conventional materials. Rather than attempting to recycle the gas phase output 584 from separator 582, the gas phase output can be used as fuel gas and/or can be sent to another refinery process with relatively low sensitivity to the CO and CO$_2$ levels typically produced during deoxygenation of a biocomponent feed. Alternately, the gas phase output can be treated, e.g., scrubbed to remove inconvenient levels of carbon oxides, for use in one or more other refinery processes, for instance with relatively high sensitivity to the CO and CO$_2$ levels.

Figure 6:
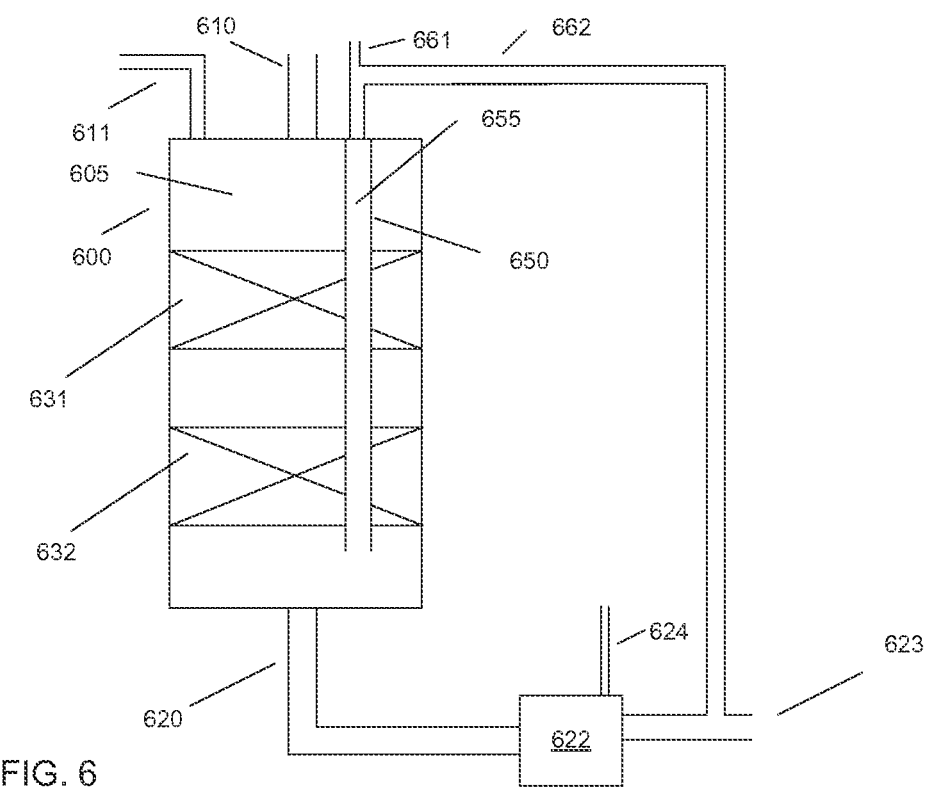
FIG. 6 depicts a reaction system suitable for performing a process according to an embodiment of the invention.

FIG. 6 schematically shows another example of a hydroprocessing configuration. In FIG. 6, reactor 600 includes a conduit 650 that forms a physically separated volume 655. In FIG. 6, conduit 650 extends past both catalyst beds 631 and 632, so that the fluid from separate volume 655 does not mix with the fluid from first reaction volume 605 until after the second catalyst bed 632. Alternately, conduit 650 can extend past fewer than all catalyst beds in a reactor, allowing the effluent from the separated volume to be co-hydroprocessed in any remaining beds in the first reaction volume 605. Reactor 600 includes feed inlet conduits 610 and 662 for providing feedstock to first reaction volume 605 and separated volume 650, respectively. In the embodiment shown in FIG. 6, feed inlet conduit 662 can represent a recycle feed. In other embodiments, feed inlet 662 can provide an additional feed stream, or a combination of a recycle feed and an additional feed. Reactor 600 can also include gas inlets 611 and 661 for introducing hydrogen and/or other input gases to first reaction volume 605 and separated volume 650, respectively.

After hydroprocessing, the effluent from both first reaction volume 605 and separated volume 655 can exit through exit conduit 620. The combined effluent can optionally be separated 622. After separation, a portion of the separated liquid phase effluent can optionally be recycled as an input 662 for the separated volume 655. The remaining liquid phase effluent 623 can be used and/or processed as desired. Gas phase effluent 624 can also be used and/or processed as desired.

Hydroprocessing Example 1

Impact of Nitrogen on Deoxygenation By-Products

One potential embodiment for a separated volume within a hydroprocessing reactor can be to improve co-processing of a high nitrogen feed with a biocomponent feed. Without being bound by theory, during deoxygenation of a biocomponent feed, it is believed that an increased nitrogen content can alter the amount of CO and CO$_2$ generated during deoxygenation. To demonstrate this, a series of experiments was performed using a blend of a biocomponent feed with a diesel boiling range feed. Table 1 shows various characteristics of 4 input feeds. The feeds in Table 1 correspond to mineral feeds. Each of these input feeds was blended with about 1.5 wt % of a biocomponent rapeseed methyl ester (RME) feed to determine the impact of nitrogen on CO and CO$_2$ production during deoxygenation.

TABLE 1

Mineral Portion of Feeds Before Combination with biocomponent

|  | Run 1 | Run 2 | Run 3 | Run 4 |
|---|---|---|---|---|
| Percent Cracked, estimate | 0 | 13.5 | 6.6 | 13.5 |
| API | 35.3 | 32.1 | 32.8 | 30.5 |
| Sulfur, ppm | 480 | 730 | 540 | 590 |
| Nitrogen, ppm | 61 | 240 | 150 | 260 |
| Bromine Number | 2.2 | 4.7 | 4.1 | 5.7 |
| IBP | 239 | 274 | 266 | 241 |
| 5 LV % | 383 | 392 | 372 | 362 |
| 10 LV % | 436 | 443 | 427 | 421 |
| 20 LV % | 481 | 487 | 481 | 493 |
| 30 LV % | 507 | 515 | 514 | 547 |
| 40 LV % | 525 | 533 | 541 | 585 |
| 50 LV % | 543 | 551 | 564 | 615 |
| 60 LV % | 561 | 572 | 588 | 644 |
| 70 LV % | 577 | 588 | 612 | 672 |
| 80 LV % | 597 | 607 | 644 | 698 |
| 90 LV % | 618 | 635 | 688 | 730 |
| 95 LV % | 632 | 662 | 720 | 753 |
| 99.5 LV % | 663 | 738 | 771 | 789 |

As shown in Table 1, feed 1 corresponds to the feed with lowest T95 boiling point, with feeds 2-4 having successively higher T95 boiling points. Feed 1 can represent a light gas oil. Feed 2 can represent a combination of a light gas oil and a light cycle oil. Feed 3 can represent roughly a 50/50 blend of a light gas oil and a heavy gas oil. Feed 4 can represent a heavy gas oil.

Table 2 shows the processing conditions used for hydrotreating each of the four combined feeds. Each feed was processed in the presence of a fresh, commercially available, high activity supported CoMo hydroprocessing catalyst. As shown in Table 2, roughly the same hydrotreatment conditions were also used for hydrotreatment of each feed. This resulted in somewhat higher sulfur levels in the products of the higher boiling feeds.

TABLE 2

| Process Conditions | Run 1 | Run 2 | Run 3 | Run 4 |
|---|---|---|---|---|
| Pressure, psig | 380 | 380 | 380 | 380 |
| Temperature, °F. | 630 | 630 | 630 | 630 |
| Treat Gas Rate (TGR), SCF/B | 860 | 860 | 860 | 860 |
| Treat gas Purity, % $H_2$ | 80 | 80 | 80 | 80 |
| LHSV ($hr^{-1}$) | 0.6 | 0.6 | 0.6 | 0.6 |
| Product Sulfur, ppm | 35 | 163 | 171 | 459 |
| Relative HDS Activity, $K_a$ | 9.5 | 3.6 | 3.2 | 1.7 |
| $H_2$ partial pressure, psia | 280 | 282 | 285 | 284 |

Figure 7:
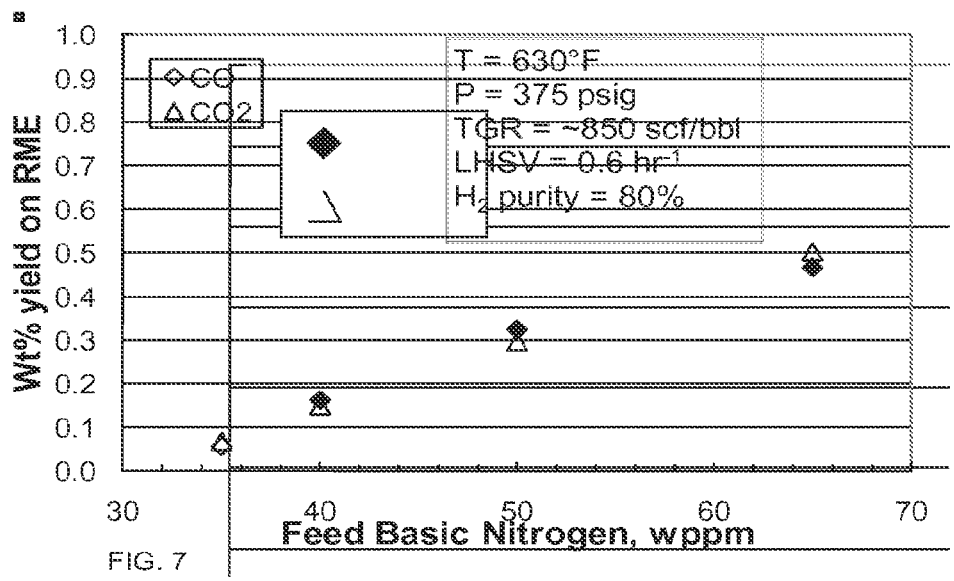
FIGS. 7 and 8 show graphic representations of reaction products from co-processing of a biocomponent feed with various feeds, plotted against certain process variables.
Figure 8:
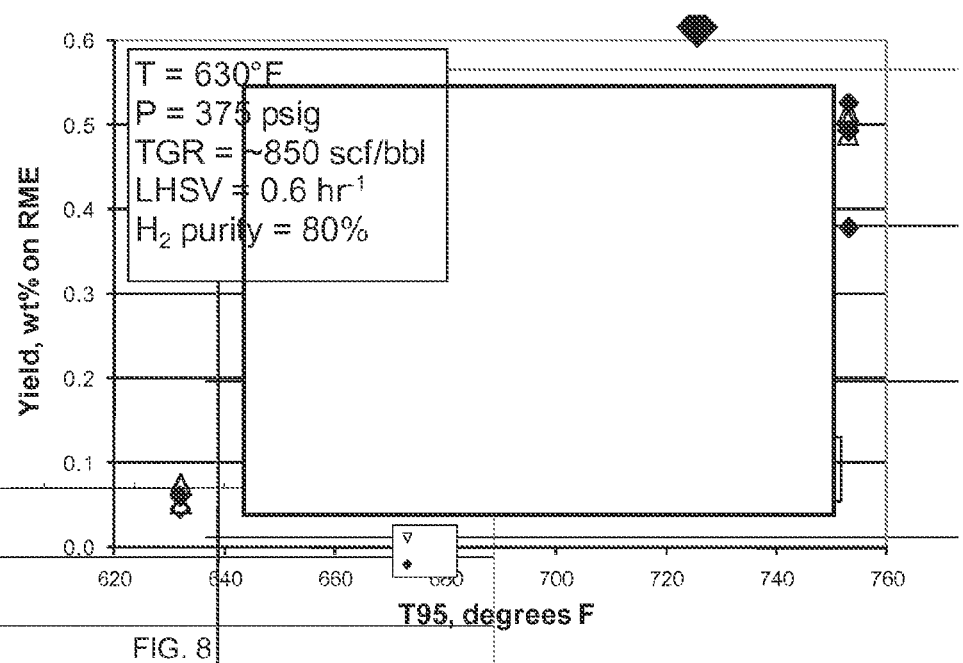

FIGS. 7 and 8 show the results from the hydroprocessing of the four feeds. The data points from left to right correspond to Runs 1 to 4, respectively. In FIG. 7, increasing the basic nitrogen content of the feed results in an increase in the amount of CO and $CO_2$ generated during hydroprocessing. Basic nitrogen corresponds to the nitrogen within a feed that reacts under certain conditions. Thus, the amount of basic nitrogen represents a portion of the total nitrogen. One standardized test for determining basic nitrogen is provided in ASTM D2896. However, for the basic nitrogen values shown in FIG. 7, a modified version of the ASTM procedure was used. Briefly, at least 0.2 g of a sample of the mineral oil was placed in about 120 ml of a titration solvent. The titration solvent was about 2 parts (by volume) chlorobenzene to about 1 part glacial acetic acid. The sample was then titrated using perchloric acid to determine the midpoint of the inflection. The basic nitrogen was calculated in wppm as Basic nitrogen=14000(V−B)(N)/W, where N=normality of the titrant; V=volume of titrant consumed by the sample in milliliters; B=volume of titrant consumed by a blank sample of the titration solvent; and W=sample weight in grams.

It is noted that the amount of basic nitrogen did not change in a predictable manner as the amount of total nitrogen changed. The amount of CO and $CO_2$ generated relative to the amount of biocomponent feed increased by a factor of five in moving from a feed with 35 wppm of basic nitrogen to a feed with 65 wppm of basic nitrogen. In a reaction system limited based on the amount of CO that can be tolerated in the hydrogen recycle loop, this can correspond to changing the amount of feed that can be processed by a factor of five. By processing a biocomponent feed in a separate volume, it is believed that at least some of the additional $CO_x$ production can be avoided, thus allowing for higher overall throughput for a reactor. FIG. 8 shows a chart of the relative amount of CO and $CO_2$ production in relation to the molecular weight of the feed. It is noted that the heavier components of the feeds contained an increased amount of nitrogen (including basic nitrogen), so FIG. 8 may indirectly indicate the impact of basic nitrogen on CO and $CO_2$ production.

Example 2

Reduction of Hydrogen Consumption for Biocomponent Feeds Based on Hydrogen Availability A mixture of a biocomponent diesel feed and a mineral diesel feed were co-processed under hydrotreatment conditions. The feed was comprised of about 30% by weight of soybean oil (biocomponent portion). Published reports indicate that the expected hydrogen consumption for hydrodeoxygenation and olefin saturation of soybean oil can be about 1500-1900 scf/bbl (about 255-323 $Nm^3/m^3$). Based on this, ~1700 scf/bbl (~290 $Nm^3/m^3$) was selected as an expected hydrogen consumption for the soybean oil. The remaining 70 wt % of the feed was a mineral feedstock portion corresponding to a light gasoil. The expected hydrogen consumption for this mineral light gasoil feed was about 100 scf/bbl (about 17 $Nm^3/m^3$). Because the feed was ~30 wt % soybean and ~70 wt % of the mineral light gas oil, an expected hydrogen consumption for the blended feed was calculated to be about 580 scf/bbl (about 99 $Nm^3/m^3$).

The mixture of ~30 wt % soybean and ~70 wt % mineral oil was processed in the presence of a CoMo catalyst under two sets of conditions where the treat gas ratio was lower than the typically recommended ratio. The first set of conditions included a process temperature of about 625° F. (about 329° C.), an $H_2$ partial pressure of about 320 psig (about 2.2 MPag), a total treat gas ratio of about 1450 scf/bbl (about 246 $Nm^3/m^3$) of ~80% hydrogen, corresponding to a hydrogen treat gas ratio of about 1160 scf/bbl (about 197 $Nm^3/m^3$), and an LHSV of about 0.6 $hr^{-1}$. The hydrogen treat gas ratio in the first set of conditions was about two times the expected hydrogen consumption for the mixed feed. In the second set of conditions, the treat gas ratio was reduced to about 780 scf/bbl for total gas (about 620 scf/bbl of hydrogen), which was less than about 110% of the hydrogen need. The target $H_2$ partial pressure was also about 320 psig (about 2.2 MPag), but, due to natural process variations, a partial pressure of about 311 psig (about 2.15 MPag) was measured at the outlet. This was believed to be close enough to the desired pressure to have minimal or no impact on the results.

The soybean oil contained roughly 10 wt % oxygen content. Because the feed was ~30% soybean oil, the total feedstock contained about 3 wt % oxygen content. Under the reaction conditions, at least about 98% of the triglycerides in the feed were converted. The oxygen content remaining in the feed was less than about 0.1 wt %, which included oxygen gas dissolved in the feed. This level of oxygen removal was considered sufficient for diesel fuel applications.

The characteristics of the effluent from these two runs are shown in Table 3. In Table 3, the yield columns for CO, $CO_2$, and $H_2O$ include two numbers. The first number represents the measured yield, while the second number shows the corresponding yield calculated if the feed had been 100% soybean oil. Table 3 shows that reducing the treat gas ratio also led to a lower hydrogen consumption for the soybean oil. Table 3 also shows that decreasing the treat gas ratio resulted in a decrease in the yield of $H_2O$ and CO, while increasing the $CO_2$ yield. The reduction in CO production was surprising, as prior reports of processing at reduced hydrogen partial pressures have shown increasing amounts of CO production. Without being bound by any particular theory, it is believed that the combination of reduced treat gas ratio and reduced hydrogen partial pressure facilitated the water gas shift reaction. This was believed to lead to increased in-situ hydrogen production and a reduction in CO production.

TABLE 3

| $H_2$ TG Ratio (scf/bbl) | Product Sulfur (wppm) | CO Yield (wt %) | $CO_2$ Yield (wt %) | $H_2O$ Yield (wt %) | Soy $H_2$ consump. (scf/bbl) |
|---|---|---|---|---|---|
| 620 | 325 | 0.25 (0.8) | 2.5 (8.4) | 1.3 (4.2) | 970 |
| 1200 | 125 | 0.5 (1.6) | 1.8 (6.1) | 1.7 (5.6) | 1200 |

Example 3

Co-processing of Palm Oil

At relatively high treat gas ratios, palm oil hydrogen gas consumption has been measured at about 1250-1500 scf/bbl (about 213-255 Nm$^3$/m$^3$). This value can be reduced by using a relatively low treat gas ratio and a relatively low pressure. Palm oil was co-processed in a feed with ~30 wt % palm oil and ~70 wt % of a light gas oil feed similar to the light gas oil described in Example 2. For this ~30/70 mixture of palm oil and light gas oil, the expected hydrogen consumption was expected to be about 450-520 scf/bbl (about 77-88 Nm$^3$/m$^3$). A treat gas ratio of about 650 scf/bbl (about 110 Nm$^3$/m$^3$) was used to hydrotreat the mixed feed in the presence of a CoMo hydrotreatment catalyst. The hydrogen consumption for the palm oil was less than about 800 scf/bbl (about 140 Nm$^3$/m$^3$). The water yield was substantially reduced relative to an expected water yield from processing at a treat gas ratio greater than two times the expected hydrogen need.

The principles and modes of operation of this invention have been described above with reference to various exemplary and preferred embodiments. As understood by those of skill in the art, the overall invention, as defined by the claims, encompasses other preferred embodiments that may not specifically be enumerated herein.

What is claimed is:

1. A method for producing a distillate boiling range product, comprising:
    introducing a first feed and a second feed into a reactor having a reactor volume, the reactor volume including a first volume and a separated volume, the first volume and the separated volume being separated by a dividing barrier within the reactor volume, the second feed including at least 20% by volume of a biocomponent feedstock;
    exposing the first feed, in the first volume, to a first hydroprocessing catalyst under first effective hydroprocessing conditions to produce a first hydroprocessing effluent;
    maintaining, by the dividing barrier, physical separation of the first feed and the second feed in at least a portion of the reactor volume; and
    exposing the second feed, in the separated volume, to a second hydroprocessing catalyst under second effective hydroprocessing conditions to produce a second hydroprocessing effluent.

2. The method of claim 1, wherein physical separation of the first feed and the second feed are maintained for the entire reactor volume.

3. The method of claim 2, wherein the first feed is a naphtha boiling range feed.

4. The method of claim 2, wherein the oxygen content of the second feed is greater than about 3 wt %.

5. The method of claim 4, wherein the second effective hydroprocessing conditions comprise effective hydrodeoxygenation conditions, the second hydroprocessing effluent comprising a liquid effluent with an oxygen content of less than about 3 wt %.

6. The method of claim 4, wherein the second hydroprocessing effluent is separated to form a gas phase effluent and a liquid effluent, further comprising:
    mixing the liquid effluent with a mineral feed to form a mixed feed; and
    hydroprocessing the mixed feed.

7. The method of claim 1, wherein the first feed has a basic nitrogen content of at least about 50 wppm.

8. The method of claim 1, wherein separation of the first feed and the second feed is maintained in the reactor volume until the first feed is downstream from at least one catalyst bed.

9. The method of claim 1, wherein the second hydroprocessing effluent is combined with the first feed and/or the first hydroprocessing effluent after a final hydroprocessing stage in the reactor volume and prior to leaving the reactor.

10. A method for producing a distillate boiling range product, comprising:
    introducing a first feed and a second feed into a reactor having a reactor volume, the reactor volume including a first volume and a separated volume, the first volume and the separated volume being separated by a dividing barrier within the reactor volume;
    exposing the first feed, in the first volume, to a first hydroprocessing catalyst under first effective hydroprocessing conditions to produce a first hydroprocessing effluent;
    maintaining, by the dividing barrier, physical separation of the first feed and the second feed in at least a portion of the reactor volume;
    exposing the second feed, in the separated volume, to a second hydroprocessing catalyst under second effective hydroprocessing conditions to produce a second hydroprocessing effluent; and
    recycling an effluent comprising at least a portion of the first hydroprocessing effluent or at least a portion of the second hydroprocessing effluent from the reactor to form at least one of the first feed or the second feed, the at least one of the first feed and the second feed comprising less than about 50 wt % of recycled effluent.

11. The method of claim 10, wherein separation of the first feed and the second feed is maintained in the reactor volume until the first feed is downstream from at least one catalyst bed.

12. The method of claim 10, wherein the recycled effluent comprises at least a portion of the first hydroprocessing effluent and at least a portion of the second hydroprocessing effluent.

13. The method of claim 10, wherein the first feed comprises less than about 50 wt % of the recycled effluent, physical separation of the first feed and the second feed are maintained for the entire reactor volume, and the recycled effluent comprises at least a portion of the second hydroprocessing effluent.

14. The method of claim 13, wherein the second feed includes an oxygen content of at least about 3 wt %, the second effective hydroprocessing conditions comprise effective hydrodeoxygenation conditions, and the second hydroprocessing effluent comprises a liquid effluent with an oxygen content of less than about 3 wt %.

15. A method for producing a distillate boiling range product, comprising:
    introducing a first feed and a second feed into a reactor having a reactor volume, the first feed having a nitrogen content that differs from a nitrogen content of the second feed by at least about 100 wppm, the first feed being introduced on a first side of a partition in the reactor volume and the second feed being introduced on a second side of the partition;
    exposing the first feed, in the reactor volume, to a first hydroprocessing catalyst under first effective hydroprocessing conditions to produce a first hydroprocessing effluent;
    maintaining physical separation of the first feed and the second feed in at least a portion of the reactor volume, the physical separation of the first feed and the second feed being maintained by the partition; and exposing the second feed, in the reactor volume, to a second hydroprocessing catalyst under second effective hydroprocessing conditions to produce a second hydroprocessing effluent.

16. The method of claim 15, wherein the first feed has a basic nitrogen content that differs from the basic nitrogen content of the second feed by at least about 50 wppm.

17. The method of claim 15, wherein at least a portion of the second feed comprises a biocomponent feedstock.

18. The method of claim 15, wherein separation of the first feed and the second feed is maintained by the partition in the reactor volume until the first feed is downstream from at least one flow distributor.

19. The method of claim 15, wherein separation of the first feed and the second feed is maintained by the partition in the reactor volume until the first feed is downstream from at least one catalyst bed.

* * * * *